United States Patent
Murashige et al.

(10) Patent No.: US 11,999,133 B2
(45) Date of Patent: Jun. 4, 2024

(54) MANUFACTURING METHOD FOR GLASS FILM WITH RESIN TAPE, AND MANUFACTURING METHOD FOR GLASS FILM

(71) Applicants: NITTO DENKO CORPORATION, Ibaraki (JP); Nippon Electric Glass Co., Ltd., Otsu (JP)

(72) Inventors: Takeshi Murashige, Ibaraki (JP); Junichi Inagaki, Ibaraki (JP); Kazuhito Hosokawa, Ibaraki (JP); Kota Nakai, Ibaraki (JP); Toshihiro Kanno, Ibaraki (JP); Yoshinori Hasegawa, Otsu (JP); Kaoru Mitsugi, Otsu (JP); Naohiro Ikai, Otsu (JP); Hiroki Mori, Otsu (JP); Yohei Kirihata, Otsu (JP)

(73) Assignees: NITTO DENKO CORPORATION, Ibaraki (JP); Nippon Electric Glass Co., Ltd., Otsu (JP)

( * ) Notice: Subject to any disclaimer, the term of this patent is extended or adjusted under 35 U.S.C. 154(b) by 0 days.

(21) Appl. No.: 17/951,955

(22) Filed: Sep. 23, 2022

(65) Prior Publication Data
US 2023/0033067 A1 Feb. 2, 2023

Related U.S. Application Data

(62) Division of application No. 16/345,211, filed as application No. PCT/JP2017/037547 on Oct. 17, 2017.

(30) Foreign Application Priority Data

Oct. 26, 2016 (JP) .................................. 2016-209753

(51) Int. Cl.
*B32B 17/10* (2006.01)
*B29C 65/48* (2006.01)
(Continued)

(52) U.S. Cl.
CPC .............. *B32B 17/10* (2013.01); *B29C 65/48* (2013.01); *B32B 17/10018* (2013.01);
(Continued)

(58) Field of Classification Search
None
See application file for complete search history.

(56) References Cited

U.S. PATENT DOCUMENTS 6,815,070 B1   11/2004   Bueukle et al.
8,525,405 B2    9/2013   Kuwabara et al.
(Continued)

FOREIGN PATENT DOCUMENTS

CN   101815682 A    8/2010
CN   101925456 A   12/2010
(Continued)

OTHER PUBLICATIONS

Office Action issued on Nov. 29, 2022, for corresponding Korean Patent Application No. 10-2021-7034443 along with an English machine translation (20 pages).
(Continued)

*Primary Examiner* — Queenie S Dehghan
(74) *Attorney, Agent, or Firm* — Hauptman Ham, LLP (57) ABSTRACT

Provided is a method comprises: continuously forming an elongated, glass film having marginal portions from molten glass into a given shape having two marginal portions, in width-directional opposite edge regions thereof, wherein the glass film having marginal portions has the marginal portions, and an effective portion formed in a width-directional central region of the glass film having marginal portions;
(Continued)

annealing the glass film having marginal portions; continuously forming resin tapes on the glass film having marginal portions at positions adjacent to and away by a given distance from the respective marginal portions, to extend in a length direction of the glass film having marginal portions; and continuously removing each of the marginal portions from the glass film having marginal portions, along a position between the marginal portion and a corresponding one of the resin tapes, or at a given width-directional position within the corresponding resin tape.

10 Claims, 5 Drawing Sheets

(51) Int. Cl.
| | | |
|---|---|---|
| *B65D 57/00* | (2006.01) | |
| *B65D 85/672* | (2006.01) | |
| *B65H 39/16* | (2006.01) | |
| *C03B 17/06* | (2006.01) | |
| *C03B 25/04* | (2006.01) | |
| *C03B 33/02* | (2006.01) | |
| *C03C 17/32* | (2006.01) | |

(52) U.S. Cl.
CPC ...... *B32B 17/10366* (2013.01); *B65D 57/004* (2020.05); *B65D 85/672* (2013.01); *B65H 39/16* (2013.01); *C03B 17/06* (2013.01); *C03B 25/04* (2013.01); *C03B 33/02* (2013.01); *C03C 17/32* (2013.01); *B32B 2329/00* (2013.01); *B32B 2367/00* (2013.01); *B32B 2369/00* (2013.01); *B65H 2701/17* (2013.01)

(56) References Cited

U.S. PATENT DOCUMENTS

| | | |
|---|---|---|
| 2007/0062219 A1 | 3/2007 | Blevins et al. |
| 2010/0192634 A1 | 8/2010 | Higuchi et al. |
| 2010/0218557 A1 | 9/2010 | Aniolek et al. |
| 2010/0276066 A1 | 11/2010 | Kondo |
| 2011/0177290 A1 | 7/2011 | Tomamoto et al. |
| 2011/0177325 A1 | 7/2011 | Tomamoto et al. |
| 2011/0177347 A1 | 7/2011 | Tomamoto et al. |
| 2011/0192878 A1 | 8/2011 | Teranishi et al. |
| 2011/0200812 A1 | 8/2011 | Tomamoto et al. |
| 2013/0240656 A1 | 9/2013 | Merz et al. |
| 2014/0130649 A1 | 5/2014 | Chang et al. |
| 2014/0319001 A1 | 10/2014 | Tomamoto et al. |
| 2016/0016746 A1 | 1/2016 | Teranishi et al. |
| 2016/0023448 A1 | 1/2016 | Bookbinder et al. |

FOREIGN PATENT DOCUMENTS

| | | |
|---|---|---|
| CN | 102083712 A | 6/2011 |
| CN | 102905891 A | 1/2013 |
| EP | 2548730 A1 | 1/2013 |
| JP | 2010-132531 A | 6/2010 |
| JP | 2011-207721 A | 10/2011 |
| JP | 2013-35159 A | 2/2013 |
| JP | 2013-79181 A | 5/2013 |
| JP | 2015-140280 A | 8/2015 |
| JP | 2015-174694 A | 10/2015 |

OTHER PUBLICATIONS

International Search Report for corresponding international application PCT/JP2017/037547 mailed on Jan. 23, 2018, along with an English translation (4 pages).
European Search Report for corresponding international application PCT/JP2017/037547 mailed on May 8, 2020 (10 pages).
Office Action issued for corresponding Chinese Patent Application No. 201780066572.1 on May 6, 2021 (receipt date: Jun. 7, 2021) (8 pages).
English machine translation of JP 2011-207721 A to Taniguchi et al., "Method for Cutting Glass Film, and Method for Production of Glass Roll", Published on Oct. 20, 2011 (15 pages).
Office Action issued for corresponding Japanese Patent Application No. 2018-547581 on Sep. 29, 2021, along with an English machine translation (8 pages).
Office Action issued on Oct. 22, 2021 for corresponding Chinese Patent Application No. 201780066572.1, along with an English machine translation (15 pages).
Decision of Refusal issued on Jan. 13, 2022 for corresponding Japanese Patent Application No. 2018-547581, along with an English machine translation (5 pages).
English machine translation of JP 2015-174694 A to Mori, "Glass Film and Glass Roll", published on Oct. 5, 2015 (19 pages).
Communication pursuant to Article 94(3) EPC issued for corresponding European Patent Application No. 17 864 145.2 on Sep. 12, 2022 (9 pages).
Office Action issued on Aug. 29, 2022 for corresponding Vietnamese Patent Application No. 1-2019-02627, along with an English translation (3 pages).
Office Action issued on May 22, 2023, for corresponding Japanese Patent Application No. 2022-066253 along with an English machine translation (9 pages).

MANUFACTURING METHOD FOR GLASS FILM WITH RESIN TAPE, AND MANUFACTURING METHOD FOR GLASS FILM

RELATED APPLICATIONS AND INCORPORATION BY REFERENCE

This application is a Divisional of U.S. patent application Ser. No. 16/345,211 filed Apr. 25, 2019, which was filed pursuant to 35 U.S.C. § 371 as a U.S. National Phase Application of International Patent Application No. PCT/JP2017/037547 filed Oct. 17, 2017, claiming the benefit of priority to Japanese Patent Application No. 2016-209753 filed Oct. 26, 2016. The contents of each of the aforementioned patent applications are herein incorporated by reference in their entirety.

TECHNICAL FIELD

The present invention relates to a manufacturing method of glass film with resin tape, and a glass film manufacturing method using the same. In particular, the present invention relates to a manufacturing method of glass film with resin tape capable of stably manufacturing a glass film with resin tape, i.e., an intermediate product of a glass film, while preventing crack development due to wrinkles and reducing the load of a marginal portion removal step, and a glass film manufacturing method using the same.

BACKGROUND ART

Recent years, in the fields of display or illumination elements using a liquid crystal display element or an organic EL element, and of solar batteries, weight reduction and thickness reduction have been promoted from the viewpoint of transportability, storability, and designability, and development toward continuous production by a roll-to-roll process has also been promoted.

In such circumstance, as a way to give flexibility to glass to be used in the above elements, it is proposed to use an ultrathin (e.g., 200 μm or less-thick) glass (hereinafter also referred to as "glass film"). A glass film has flexibility, so that it is capable of being wound in the form of a roll, and thus processed through the roll-to-roll process. Heretofore, there have been disclosures about a method of subjecting a glass film to processing to form a polarizer, a transparent electrode or the like thereon through the roll-to-roll process, and others.

For example, U.S. Pat. No. 8,525,405B discloses a method of producing a display having a flexible glass layer, through the roll-to-roll process.

Generally, sheet glasses including a glass film are produced by forming molten glass into a flat and smooth sheet shape, and annealing (slowly cooling) or cooling the resulting shaped body. As a technique to form molten glass into a sheet shape, there has been known: a float process which comprises forming molten glass floated on liquid tin, into a sheet shape, by gradually drawing the molten glass in a horizontal direction; a slot downdraw process which comprises forming molten glass into a sheet shape by gradually drawing the molten glass from a sheet-shaped opening (slot) in a vertical direction; an overflow downdraw process which comprises causing molten glass to overflow from a forming trough and then guiding the overflowed glass downwardly, and others.

Although these process are different from each other in terms of a specific means for forming molten glass into a sheet shape, they resemble each other in terms of taking a technique for mechanically holding lateral opposite edge regions of glass so as to enable the glass to be formed into a sheet shape (including a thin sheet shape). As a result, relatively thick marginal portions are formed in the respective edge regions of the glass, so that a difference in thickness arises between each of the edge regions and an inward region of the glass. The presence of the thick marginal portions in the edge regions causes difficulty in winding operation for the resulting glass film. Thus, it is common practice to produce a glass roll by winding the glass film after going through a step of cutting and removing the thick marginal portions along a longitudinal direction of the glass film by a laser, as described in JP 2010-132531A.

On the other hand, due to the difference in thickness between each of the thick edge regions (marginal portions) and the inward region, arising during formation of the glass film, a difference in cooling rate arises between each of the edge regions and the inward region, i.e., the sheet glass is cooled in a state in which there is a temperature difference between each of the edge regions and the inward region. That is, the difference in cooling rate leads to a difference in thermal shrinkage between each of the edge regions and the inward region, and the difference in thermal contraction leads to a difference in area within the sheet glass. This difference in area is not particularly problematic in a sheet glass having a thickness of around 700 μm. On the other hand, in a ultrathin glass sheet (glass film) having a thickness of 200 μm or less, the difference in area is observed as wrinkles in the inward region, because the glass film has flexibility. In this glass film having marginal portions with wrinkles, the state of the wrinkles is always changed during conveyance, and the state of stress which arises at a cut site is also changed depending on the change in the state of the wrinkles. This causes difficulty in performing a slitting step of continuously cutting and removing the marginal portions by a laser or the like.

With a view to solving this problem, JP 2015-140280A describes a technique of cutting and removing the marginal portions by a laser after smoothing out the wrinkles arising in the glass film. According to this document, it is described that, by performing the laser cutting after smoothing out the wrinkles, it becomes possible to stably remove the marginal portions.

However, even when the above technique is employed in the continuous cutting of the marginal portions (slitting step), it is unable to continuously remove the marginal portions in a stable manner, because it is difficult to completely remove the wrinkles, in principle. Further, during the continuous cutting of the marginal portions, a crack is likely to develop toward the inward region of the glass film due to the wrinkles, thereby causing a halt to the continuous cutting of the marginal portions. However, the above technique is incapable to stopping development itself of a crack.

CITATION LIST

Parent Document

Patent Document 1: U.S. Pat. No. 8,525,405B
Patent Document 2: JP 2010-132531A
Patent Document 3: JP 2015-140280A

SUMMARY OF INVENTION

Technical Problem

In view of solving the above problems, it is an object of the present invention to provide a manufacturing method of glass film with resin tape capable of stably manufacturing a glass film with resin tape, i.e., an intermediate product of a glass film, while preventing crack development due to wrinkles and reducing the load of a continuous marginal portion removal step, and a glass film manufacturing method using the same.

Solution to Technical Problem

As a result of diligent researches for solving the above problems, the inventers found that crack development due to wrinkles can be prevented to solve the above problem by, when continuously removing an unnecessary part (marginal portions) from an elongated, glass film having marginal portions, forming resin tapes on the glass film having marginal portions at given positions adjacent to respective width-directional opposite edge regions of the glass film having marginal portions, and then performing the continuous removal of the edge regions (marginal portions), and have finally reached the present invention.

The present invention made to solve the above problems relates to a manufacturing method of glass film with resin tape comprising: a forming step of continuously forming an elongated glass film having marginal portions having marginal portions in width-directional opposite edge regions thereof from molten glass, wherein the glass film having marginal portions has the marginal portions, and an effective portion formed in a width-directional central region of the glass film having marginal portions; an annealing step of annealing the glass film having marginal portions; a resin tape forming step of continuously forming resin tapes on the glass film having marginal portions at positions adjacent to and away by a given distance from the respective marginal portions, in a length direction of the glass film having marginal portions; and a marginal portion removal step of continuously removing each of the marginal portions from the glass film having marginal portions, at a position between the marginal portion and a corresponding one of the resin tapes, or at a given width-directional position within the resin tape, to form a glass film with resin tape.

Preferably, in the manufacturing method of glass film with resin tape of the present invention, the resin tape forming step comprises a resin tape attaching step of attaching the resin tape to a surface of the glass film having marginal portions, while continuously feeding the resin tape from a resin tape roll.

More preferably, in the above manufacturing method of glass film with resin tape, the resin tape attaching step includes applying an adhesive to an interface between the resin tape and the glass film having marginal portions.

It should be noted here that the term "adhesive" includes a so-called "pressure-sensitive adhesive".

As an alternative, in the manufacturing method of glass film with resin tape of the present invention, the resin tape forming step may comprise a resin solution application step of continuously applying a resin solution to a surface of the glass film having marginal portions, in a tape-like configuration.

More preferably, in the above manufacturing method of glass film with resin tape, the resin solution is a solution of a thermo-curable resin or a photo-curable resin.

Preferably, in the manufacturing method of glass film with resin tape of the present invention, the resin tape forming step includes forming the resin tapes at positions away from edge sides of the glass film having marginal portions by 40% or less of a width of the glass film having marginal portions.

Preferably, in the manufacturing method of glass film with resin tape of the present invention, the forming step includes using one selected from the group consisting of a float process, an overflow downdraw process, and a slot downdraw process.

Preferably, in the manufacturing method of glass film with resin tape of the present invention, the effective portion has a thickness of 20 to 500 μm.

Preferably, the manufacturing method of glass film with resin tape of the present invention comprises a winding step of winding the glass film with resin tape in the form of a roll.

More preferably, in the above manufacturing method of glass film with resin tape,
the resin tape forming step includes continuously forming the resin tapes on only one surface of the glass film having marginal portions, and the winding step includes winding the glass film having marginal portions in the form of a roll, in a posture where the one surface of the glass film with resin tape faces outwardly.

More preferably, in the above manufacturing method of glass film with resin tape, the winding step includes continuously feeding a protective sheet from a protective sheet roll, and winding the glass film with resin tape in the form of a roll, together with the protective sheet.

The present invention preferably comprises: a step of obtaining a glass film with resin tape using the above manufacturing method of glass film with resin tape; and a resin tape removal step of continuously removing, from the glass film with resin tape, width-directional opposite edge regions of the glass film with resin tape on which the resin tapes are formed, thereby forming a glass film.

Preferably, the glass film manufacturing method of the present invention comprises a winding step of winding the glass film in the form of a roll.

Preferably, the glass film manufacturing method of the present invention comprises a step of cutting the glass film in a width direction thereof.

Effect of Invention

The manufacturing method of glass film with resin tape and the glass film manufacturing method of the present invention make it possible to stably manufacture a glass film with resin tape (typically, a resin tape-attached glass roll), i.e., an intermediate product of a glass film, and a glass film (typically, a glass roll or a sheet-shaped glass film), while preventing crack development due to wrinkles and reducing the load of the continuous marginal portion removal step.

DESCRIPTION OF EMBODIMENTS

Figure 1:
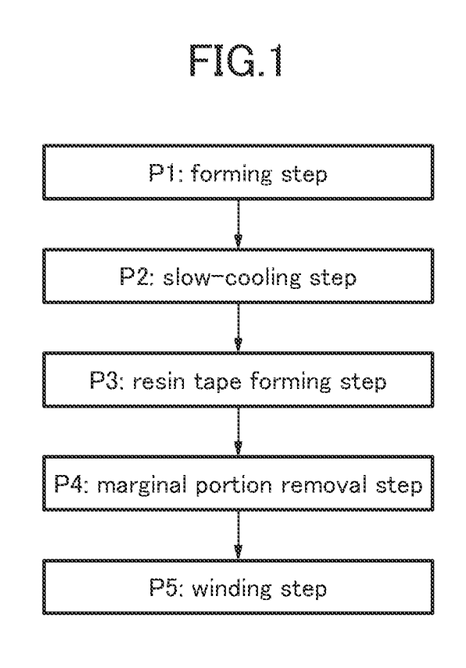
FIG. 1 is a process flow chart of a manufacturing method of glass film with resin tape according to the present invention.

FIG. 1 is a process flow chart of a manufacturing method of glass film with resin tape according to the present invention. As depicted in FIG. 1, the manufacturing method of glass film with resin tape according to the present invention comprises a forming step (P1), an annealing step (P2), a resin tape forming step (P3), and a marginal portion removal step (P4), and may further comprises a winding step (P5). Specific examples of these steps will be described in detail below.

Figure 2:
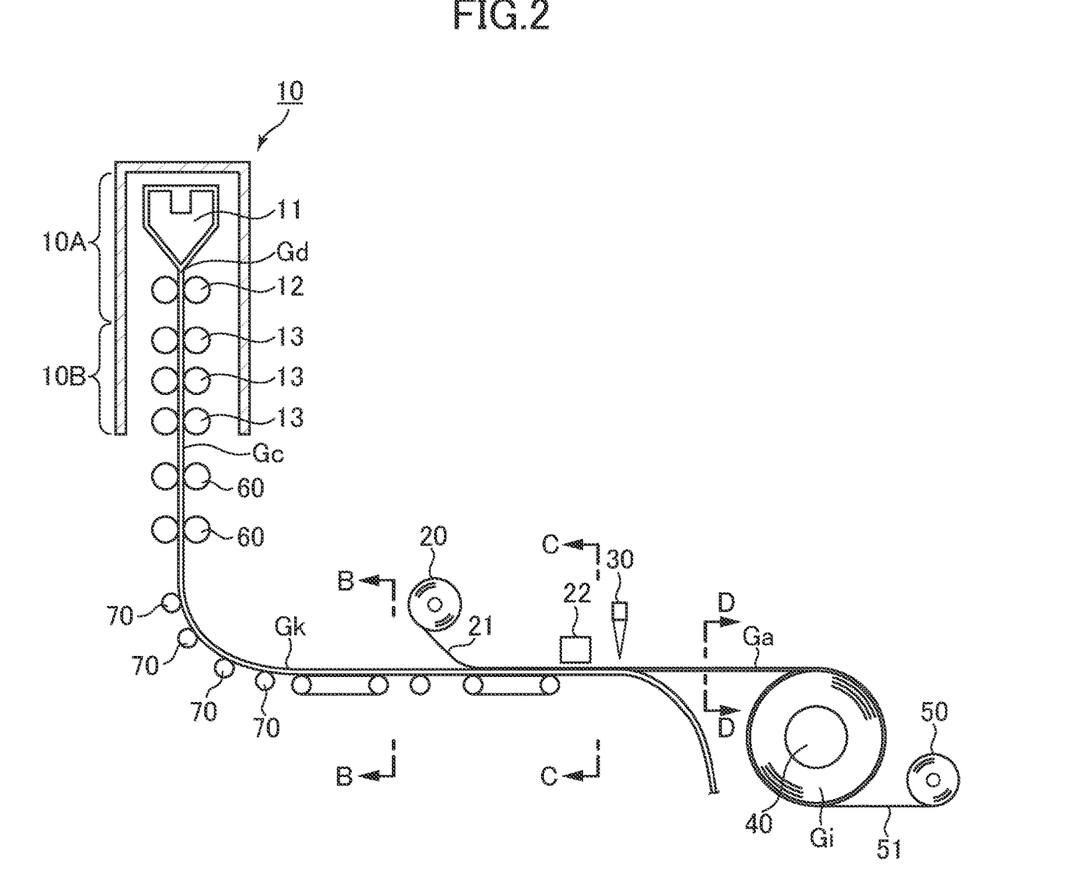
FIG. 2 is a schematic diagram for explaining one example of the overall process of the manufacturing method of glass film with resin tape according to the present invention.
Figure 3A:
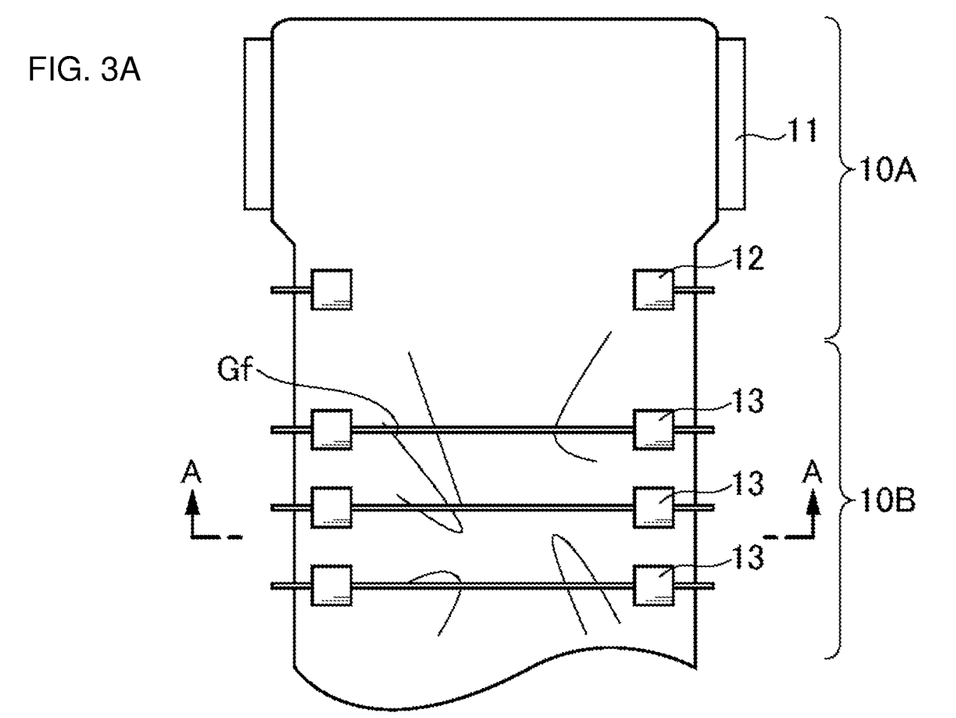
FIG. 3A is a schematic diagram for explaining the details of one example of a forming step in the manufacturing method of glass film with resin tape according to the present invention.
Figure 3B:
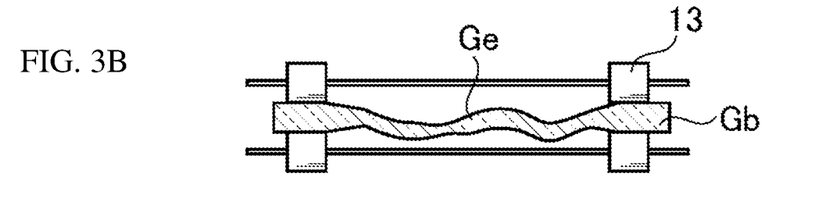
FIG. 3B is a sectional view taken along the line A-A in FIG. 3A.

FIG. 2 is a schematic diagram for explaining one example of the overall process of a manufacturing method for a glass film with resin tape Ga, according to the present invention. FIGS. 3A and 3B are schematic diagrams for explaining the details of one example of a forming step in the manufacturing method for the glass film with resin tape Ga, according to the present invention.

<Forming Step (P1)>

The forming step (P1) is a step of continuously forming an elongated, glass film having marginal portions Gc from molten glass into a given shape having two marginal portions Gb, respectively, in width-directional opposite edge regions thereof.

According classification by composition, examples of a raw material for the molten glass include soda-lime glass, borosilicate glass, aluminosilicate glass, and quartz glass. Further, according classification by alkaline component, examples thereof include alkali-free glass, and low-alkali glass. Preferably, alkali-free glass is used. This is because alkali-free glass is excellent in strength and chemical durability. The molten glass is used in a molten state after heating at an arbitrary appropriate temperature (1400° C. to 1700° C.).

Examples of a technique to continuously form the molten glass into a film shape include an overflow downdraw process, a slot downdraw process, and a float process. Even by employing any one of the above processes, it is possible to continuously form the elongated, glass film having marginal portions Gc into a given shape having the marginal portions Gb in the respective width-directional opposite edge regions thereof. It is to be understood that the present invention is not limited to the above forming processes as long as the marginal portions Gb are formed in the respective width-directional opposite edge regions of the glass film having marginal portions Gc.

In particular, the overflow downdraw process is preferable as a technique to continuously form a thinned glass film. A glass film obtainable through this process has a feature that each surface thereof has excellent smoothness, i.e., this process is less likely to cause in-plane defects, and suitable for continuously forming a glass film.

With reference to FIGS. 2 and 3, a specific example of the forming step using the overflow downdraw process will be described.

As depicted in FIG. 2, a forming apparatus 10 has a forming region 10A in which a forming body 11 having a wedge-shaped outer surface in vertical section is disposed. When glass melted in a non-depicted melting kiln (molten glass) is supplied into the forming body 11, the molten glass overflows from a top opening of the forming body 11. Then, forming of the molten glass into a glass film ribbon Gd is started such that the overflowed molten glass flows downwardly along opposite lateral surfaces of the forming body 11 having a wedge shape in vertical section, and merges at a lower end of the forming body 11. After merging at the lower end, width-directional opposite edge regions of the glass film ribbon Gd are held, respectively, by two cooling roller pairs 12, so that two thick marginal portions Gb (see FIG. 3B) are formed, respectively, in the width-directional opposite edge regions of the glass film ribbon Gd. By forming the marginal portions Gb, it is possible to suppress aggregation due to surface tension and thermal shrinkage, and promote thinning and curing while maintaining the form of a film. This makes it possible to form a glass film having marginal portions Gc into a given shape. Although metal roller pairs are typically used as the cooling roller pairs 12, the present invention is not limited thereto.

(P2) Annealing Step

The annealing step (P2) is a step of annealing the glass film having marginal portions Gc.

As depicted in FIGS. 2 and 3, a plurality of sets of two annealer roller pairs 13 and a non-depicted heater are arranged in an annealing region 10B. The annealing region 10B is set such that a given temperature gradient is formed by the non-depicted heater, so that, as the glass film having marginal portions Gc flows downwardly along the annealing region 10B, the temperature thereof is gradually lowered and thus thermal strain generated thereinside is removed. In this example, the annealer roller pairs 13 in the annealing region 10B are made of an inorganic material comprising ceramic fibers and a binder. However, the present invention is not limited thereto. Further, all the annealer roller pairs 13 need not hold the glass film having marginal portions Gc, but part of the annealer roller pairs 13 may be an idle roller pair.

As depicted in FIGS. 3A and 3B, in the glass film having marginal portions Gc, each of the edge regions which are being held is maintained thick (as the marginal portion Gb), whereas an inward thinned region (thinned portion Ge) is stretched in a flow direction, in principle. As a result, a difference in size (area difference) between the marginal portion Gb and the thinned portion Ge occurs. This is assumed to cause generation of wrinkles Gf in the thinned portion Ge. However, if the marginal portions Gb are removed, the wrinkles Gf in the thinned portion Ge are relieved, and thus it becomes possible to form a glass film with resin tape or glass film and continuously wind it.

(P3) Resin Tape Forming Step

The resin tape forming step is roughly classified into the following two processes. Specifically, (1) process of attaching at least two tape-shaped resin films onto a surface of the glass film having marginal portions, while continuously feeding the tape-shaped resin films (resin tape attaching step), and (ii) continuously applying resin in solution form to a surface of the glass film, and curing the resin to form at least two tape-shaped resin films on the surface (resin solution application step).

(i) Process of Laminating Tape-Shaped Resin Films (Resin Tapes) to Glass Film Having Marginal Portions (Resin Tape Attaching Step)

Examples of a laminating method includes a technique of laminating tape-shaped resin films (resin tapes), while forming resin films into a tape shape, and a technique of laminating resin films each preliminarily formed into a tape shape. As a technique to develop adhesiveness between each of the tape-shaped resin films and the glass film having marginal portions, an adhesive or pressure-sensitive adhesive is preferably interposed between the resin tape and the glass film having marginal portions. Alternatively, each of the resin tapes may be thermally fused before or after lamination of the resin tape to develop adhesiveness with respect to the glass, based on an anchor effect.

In a particularly preferred embodiment, the lamination is performed while the resin tapes each wound into a roll are continuously unrolled and fed, and an adhesive or pressure-sensitive adhesive is interposed between each of the resin tape and the glass.

The resin tapes are arranged and laminated at positions adjacent to and away by a given distance from the respective marginal portions of the glass film having marginal portions.

Examples of a material for the resin tapes include polyethylene, polyvinyl chloride, polyethylene terephthalate, polyvinylidene chloride, polypropylene, polyvinyl alcohol, polyester, polycarbonate, polystyrene, polyacrylonitrile, an ethylene vinyl acetate copolymer, an ethylene-vinyl alcohol copolymer, an ethylene-methacrylic acid copolymer, nylon, cellophane, and a silicone resin. The resin tape may be formed as a mixture or a laminate thereof. From an industrial viewpoint, polyethylene terephthalate resin is preferable.

As a production method for resin tapes made of the above materials, it is possible to use an inflation process, a T-die process, a melt casting process, a calender process, etc. From an industrial viewpoint, it is preferable to produce a resin tape roll by, after forming a wide-width resin film through one of the above processes, slitting the wide-width resin film into a given width, and winding the resulting tape-shaped resin film.

The resin film laminated through an adhesive or pressure-sensitive adhesive are preferably subjected to cross-linking reaction, and stabilized, using a device for radiating ultraviolet light or electron beam. In this way, the glass film having marginal portions and the resin tapes are strongly fixed together, so that it can be expected to enhance the effect of suppressing crack development in the glass.

A technique to interpose an adhesive or pressure-sensitive adhesive between each of the resin tapes and the glass film having marginal portions may comprise: dropping or continuously applying liquid adhesive or pressure-sensitive adhesive to one or each of the resin tape and the glass film having marginal portions; or laminating a sheet-shaped adhesive film or pressure-sensitive adhesive film to the resin tape or the glass film having marginal portions successively to or currently with the lamination of the resin tape. Alternatively, a roll formed by winding a laminate of a resin tape preliminarily applied with an adhesive or pressure-sensitive adhesive and a release film (separator) attached onto the adhesive or pressure-sensitive adhesive may be used.

Figure 4A:
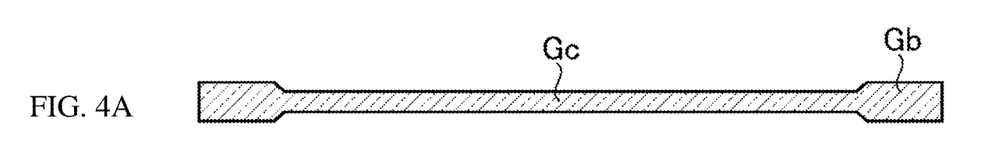
FIGS. 4A to 4C are schematic diagrams for explaining respective steps of the manufacturing method of glass film with resin tape according to the present invention.
Figure 4B:
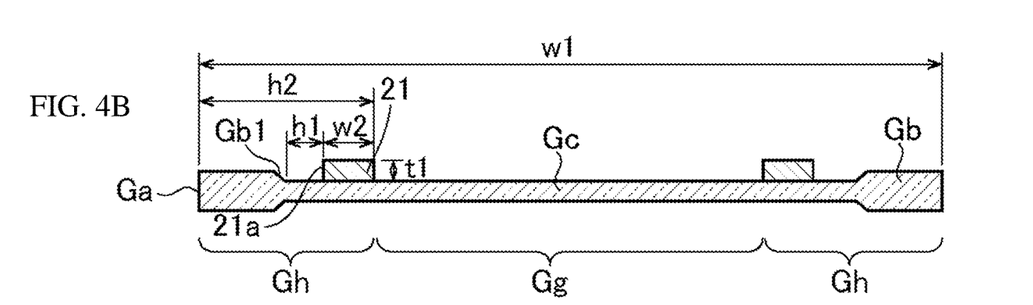
Figure 4C:
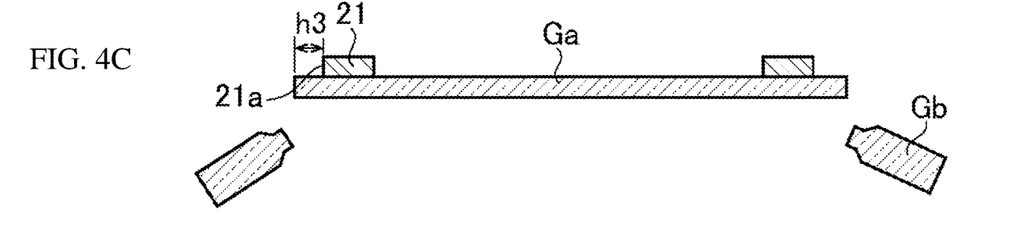
Figure 5:
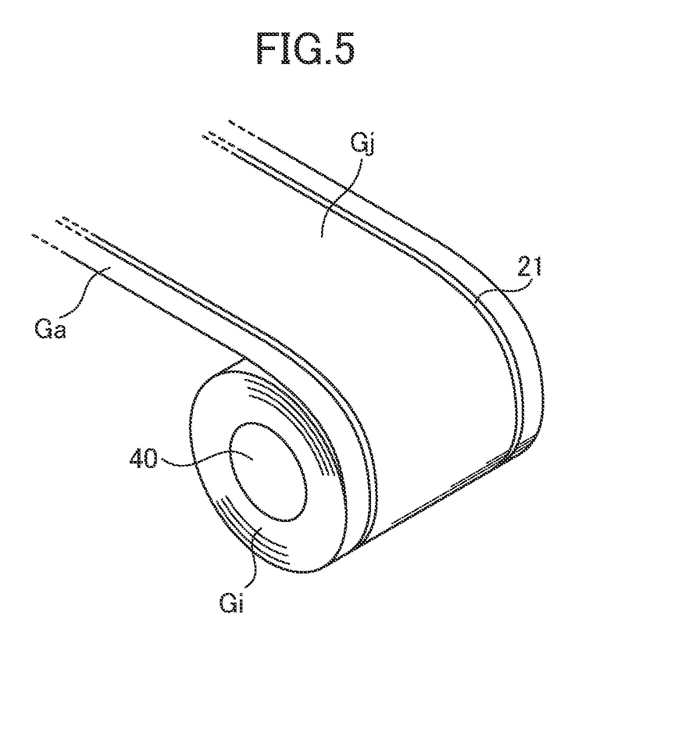
FIG. 5 is a schematic diagram for explaining the details of one example of a glass film winding step in the manufacturing method of glass film with resin tape according to the present invention.

FIGS. 4A to 4C are schematic diagrams for explaining respective steps of the manufacturing method of glass film with resin tape according to the present invention. Specifically, FIG. 4A, FIG. 4B and FIG. 4C are, respectively, a sectional view taken along the line B-B in FIG. 2, a sectional view taken along the line C-C in FIG. 2, and a sectional view taken along the line D-D in FIG. 2.

With reference to FIGS. 2 and FIGS. 4A to 4C, a particularly preferred embodiment will be described. Each of two resin tapes 21 is continuously fed from a resin tape roll 20. Then, after applying an adhesive (not depicted) to each of the resin tapes 21, the resin tapes 21 are laminated to the glass film having marginal portions Gc at positions adjacent to and away by a given distance from the respective marginal portions Gb, and irradiated with ultraviolet light from an ultraviolet light irradiation device 22 to continuously form the resin tapes 21 in a length direction of the glass film having marginal portions Gc.

As depicted in FIG. 4B, the glass film having marginal portions Gc normally has the thick marginal portions Gb, and an effective portion Gg formed in a width-directional central region of the glass film having marginal portions Gc. Here, the effective portion Gg is a portion of the glass film having marginal portions Gc formed between the resin tapes 21. The effective portion Gg includes a region which is guaranteed in terms of a desired thickness and is capable of shipment as a product. Considering that the effective portion Gg includes a region to be used as a product, the thickness of the effective portion Gg is preferably 20 μm to 500 μm, more preferably 20 μm to 300 μm, still more preferably 20 μm to 150 μm, from the viewpoint of handling and flexibility.

On the other hand, a non-effective portion Gh is resin tapes 21 and a portion of the glass film having marginal portions Gc outside each of the resin tapes 21. Specifically, the non-effective portion Gh include the marginal portions Gb and a portion whose thickness gradually decreases from the marginal portions Gb toward the effective portion Gg, i.e., includes a region which is not guarantee in terms of a desired thickness as a product, and is incapable of shipment as a product. In a case where it is necessary to set the width of the effective portion Gg to a relatively small, a region guaranteed as a product may be partially included in the non-effective portion Gh.

In this embodiment, the given distance means a distance h1 between one of opposite edges 21a of each of the resin tapes 21 on the side of a corresponding one of the marginal portions Gb, and an edge Gb1 of the corresponding marginal portion Gb on the side of the resin tape 21, as depicted in FIG. 4B. In this embodiment, from the view point of widely ensuring the effective portion Gg, a distance h2 between the edge side Gc1 of the glass film having marginal portions Gc and the edge 21a of the resin tapes 21 is preferably 40% or less, more preferably 30% or less, still more preferably 20% or less, particularly preferably 10% or less, of the width w1 of the glass film having marginal portions Gc.

Further, from the viewpoint of effectively preventing crack development, in a case where, in the marginal portion removal step (P4) descried in detail later, each of the marginal portions Gb is continuously removed along a given width-directional position between the marginal portion Gb and a corresponding one of the resin tapes 21, the width w2 of each of the resin tapes 21 is preferably 3 mm or more, more preferably 10 mm or more. On the other hand, in a case where, in the marginal portion removal step (P4) descried in detail later, each of the marginal portions Gb is continuously removed at a given width-directional position within the corresponding resin tape, the width w2 of each of the resin tapes 21 is selected such that the width of a part of the resin tape to be left on the glass film with resin tape Ga preferably becomes 3 mm or more, more preferably 10 mm or more. Further, from the viewpoint of ensuring the width of the effective portion Gg, the width w2 is preferably 100 mm or less, more preferably 50 mm or less.

Further, from the viewpoint of effectively preventing crack development, the thickness t1 of each of the resin tapes 21 is preferably 25 μm to 500 μm, more preferably 50 μm to 200 μm. It should be noted here that, in case of using a non-depicted adhesive layer, the thickness t1 of each of the resin tapes 21 is a thickness as measured after removing the adhesive layer.

In a case where the adhesive is liquid form, when the resin tapes are laminated to the glass film having marginal portions, the adhesive has good wettability and spreading with respect to the glass, so that air bubbles or the like are less likely to be entrained between the glass and each of the resin tapes. Further, before the adhesive is cured, there is a chance for each of the adhesive tapes to freely slide on the surface of the glass. Thus, slight wrinkles and meandering irregularly occurring during the lamination are advantageously self-corrected before curing of the adhesive.

Examples of the adhesive include an epoxy-based adhesive, an acrylic-based adhesive, a urethane-based adhesive, a rubber-based pressure-sensitive adhesive, an acrylic-based pressure-sensitive adhesive, a silicone-based pressure-sensitive adhesive and a urethane-based pressure-sensitive adhesive, and any mixture thereof. From the viewpoint of effectively preventing crack development, the thickness of the adhesive layer is preferably 1 μm to 10 μm, more preferably 1 μm to 40 μm.

(ii) Process of Continuously Applying Resin in Solution Form to Surface of Glass Film (Resin Solution Application Step)

As a resin material, it is possible to use a solvent-dissolvable resin, or a thermo- or photo-curable resin.

As the solvent-dissolvable resin, it is possible to use polyimide, polyamide, polyarylate, polyethylene, polyvinyl chloride, polyethylene terephthalate, polyvinylidene chloride, polypropylene, polyvinyl alcohol, polyester, polycarbonate, polystyrene, polyacrylonitrile, polyvinyl alcohol, triacetylcellulose, an ethylene vinyl acetate copolymer, an ethylene-vinyl alcohol copolymer, an ethylene-methacrylic acid copolymer, nylon, cellophane, or silicone resin, or any mixture thereof.

Examples of the thermo- or photo-curable resin include an epoxy-based resin, an acrylic-based adhesive, a urethane-based adhesive, and a rubber-based resin, and any mixture thereof.

In a preferred embodiment, the solution-form solvent-dissolvable resin or the thermo- or photo-curable resin is continuously applied onto the surface of the glass film at positions adjacent to and away by a given distance from the respective marginal portions, and irradiated with heat, light or electron beam to continuously form two resin tapes in the length direction of the glass film.

In this preferred embodiment, the width and position of each of the resin tapes are the same as those in the above resin tape attaching step.

(P4) Marginal Portion Removal Step

The marginal portion removal step (P4) is process of continuously removing each of the marginal portions Gb from the glass film having marginal portions Gc, along a position between the marginal portion Gb and a corresponding one of the resin tapes 21, or at a given width-directional position within the corresponding resin tape 21, to form a glass film with resin tape Ga.

As a technique to remove the marginal portions Gb, it is possible to use a technique of mechanically cutting the glass, a technique of flawing (scribing) the surface of the glass, and glowing a crack (breaking the glass) by heat or bending stress, or a technique of volatilizing the glass or fragmenting the chemical bonding of the glass by light. Referring FIG. 2 again, as a technique to continuously remove the marginal portions Gb, it is preferable to use, as an energy source, light, particularly a laser light source 30 capable of radiating laser light as collimated and coherent light. It is preferable to select laser light having a wavelength bend in which light absorption by a glass is significant. Further, for increasing irradiation energy, it is effective to focus the laser light inside the glass by using an optical system such as lenses. As the laser light source 30, it is possible to use a $CO_2$ laser, a YAG laser or the like. As depicted in FIG. 4C, in order to adequately perform the marginal portion removal step P4, a distance h3 from the one edge of the resin tape 21a of the resin tape 21 to a cut line by the laser light source 30 is preferably set to 1 mm or more, more preferably 3 mm or more. In this manner, each of the marginal portions Gb can be continuously removed from the glass film having marginal portions Gc, along a given position between the marginal portion Gb of the glass film having marginal portions Gc and a corresponding one of the resin tapes 21, as depicted in FIG. 4C (or within the corresponding resin tape 21), to produce a glass film with resin tape Ga. As a result of cutting and removal of the marginal portions Gb, the wrinkles Gf generated in the glass film having marginal portions Gc are relieved. Here, from the viewpoint of more simply performing the continuous removal of the marginal portions, it is preferable to continuously remove each of the marginal portions Gb from the glass film having marginal portions Gc, along a given width-directional position between the marginal portion Gb and a corresponding one of the resin tapes 21, as depicted in FIG. 4C.

The manufacturing method of glass film with resin tape according to the present invention may further comprise the winding step (P5) to produce a roll of the glass film with resin tape Ga (hereinafter referred to as "resin tape-attached glass roll Gi").

(P5) Winding Step

The winding step (P5) depicted in FIG. 1 is process of winding the glass film with resin tape Ga in the form of a roll to produce a resin tape-attached glass roll Gi.

As depicted in FIGS. 2 to FIG. 5, in a case where the resin tapes 21 are formed on only one surface (upper surface Gj) of the glass film with resin tape Ga, it is preferable to wind the glass film with resin tape Ga around a winding core 40, in a posture where the upper surface Gj of the glass film with resin tape Ga on which the resin tapes 21 are formed, face outwardly.

Thus, even when a curvature arises in the glass film with resin tape Ga during winding, it becomes possible to effectively block growth of a crack starting from an edge of the glass film with resin tape Ga in a tearing direction by a corresponding one of the resin tapes 21.

Further, it is preferable to, during winding the glass film with resin tape Ga, continuously feed a protective sheet 51 from a protective sheet roll 50, and wind the glass film with resin tape Ga in the form of a roll, together with the protective sheet 51. This makes it possible to protect the surface of the glass film, and prevent winding displacement from being fixed due to blocking caused by smoothness of the surface of the glass film. Although the protective sheet 51 is not particularly limited, but examples thereof includes: a resin sheet such as polyethylene terephthalate, polystyrene, polyethylene, polypropylene, polyimide, nylon, polyvinyl chloride, polyester, polycarbonate, cellophane, or silicone; a foamable resin sheet; and paper.

From the view point of continuing good winding without winding displacement, it is preferable to dispose the protective sheet 51 between the resin tapes 21. This makes it possible to prevent interference between the protective sheet 51 and the resin tapes 21. In this case, in order to prevent the resin tapes 21 on a previously-wound part of the glass film with resin tape Ga from coming into contact with a subsequently-wound part of the glass film in the glass film with resin tape Ga, it is preferable that the thickness of the protective sheet 51 is greater than the thickness of each of the resin tapes 21 (when using the adhesive layer, the total thickness of the resin tape as a substrate and the adhesive layer). Thus, even when the thickness of the adhesive layer becomes uneven when each of the resin tape 21 is bonded to the glass film having marginal portions Gc, the resin tapes 21 never come into contact with the glass film, during production of the resin tape-attached glass roll Gi. This makes it possible to prevent the occurrence of winding displacement due to the unevenness of the thickness of the adhesive layer, during production of the resin tape-attached glass roll Gi.

On the other hand, from the viewpoint of protecting edge faces of the resin tape-attached glass roll Gi after the winding, it is preferable that the width of the protective sheet 51 is greater than the width of the glass film with resin tape Ga.

FIG. 2 depicts a production system constructed by selectively combining desirable examples of the above process elements (P1 to P5). However, the present invention is not limited thereto. Further, the schematic diagram depicts a process in which, after the glass film having marginal portions Gc is formed into a given shape and solidified through the overflow downdraw process, while being conveyed in a vertical direction, and further conveyed by feed roller pairs 60, the direction of the glass film having marginal portions Gc is changed in a transverse direction by direction-change rollers 70, and then the wounding step is performed. However, the glass film having marginal portions Gc may be conveyed only in the vertical direction by omitting the direction-change rollers 70, or may be conveyed only in the transverse direction in a case where the float process is employed. The process elements P1 to P5 are not limited to those in FIG. 2, as long they are an optimal arrangement in terms of productivity under restrictions of principle.

In the resin tape forming step (P3) depicted in FIG. 2, the resin tapes 21 are formed on only the upper surface Gj of the glass film having marginal portions Gc. However, the present invention is not limited thereto, but the resin tapes 21 may be formed on only a lower surface or each of the upper and lower surfaces of the glass film having marginal portions Gc.

Figure 6:
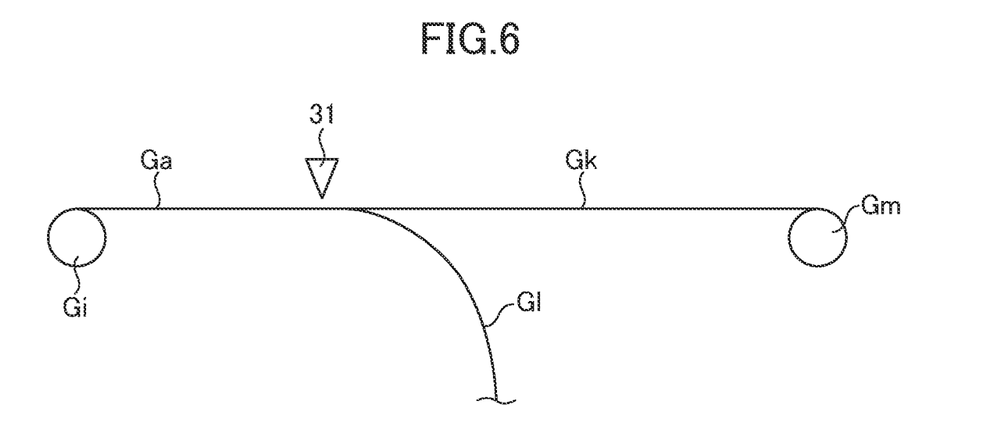
FIG. 6 is a schematic diagram for explaining one example of a glass film manufacturing method according to the present invention.

FIG. 6 is a schematic diagram for explaining one example of a glass film manufacturing method according to the present invention.

For example, as depicted in FIG. 6, a glass film Gk according to the present invention is produced by: unrolling the glass film with resin tape Ga from the resin tape-attached glass roll Gi; and performing a resin tape removal step of continuously removing, from the glass film with resin tape Ga, width-directional opposite edge regions G1 of the glass film with resin tape Ga on which the resin tapes are formed, by cutting means such as a laser light source 31. As depicted in FIG. 6, the glass film Gk may be further wound into a roll of the glass film Gk (glass roll Gm), or may be cut in a width direction by a non-depicted width-directional cutting device, to produce a sheet-shaped glass film Gk. Further, a feeding source is not limited to the the resin tape-attached glass roll Gi, but may be the sheet-shaped glass film with resin tape Ga in an unrolled state. The glass film with resin tape Ga is free of wrinkles Gf, as mentioned above. Thus, the width-directional opposite edge regions G1 of the glass film with resin tape Ga can be continuously removed adequately by the laser light source 31, without further firming the resin tapes 21.

EXAMPLES

Although the manufacturing method of glass film with resin tape according to the present invention will be described in detail based on an example, it should be noted that the present invention is not limited to such an example.

Inventive Example

A glass film with resin tape was produced using the method described in connection with FIG. 2. Specifically, a glass film having marginal portions was formed into a given shape through the overflow downdraw process, to have a width of 1500 mm. The thickness of each of two marginal portions was 1 mm, the thickness of an effective portion was 100 μm. After annealing the glass film having marginal portions, the direction of the glass film having marginal portions was changed to a transverse direction. Each of two resin tapes made of polyethylene terephthalate (PET) and formed to have a width of 25 mm was laminated to an upper of the glass film having marginal portions after being subjected to the direction change, while an ultraviolet-curing resin was interposed therebetween at a thickness of 20 μm. After the lamination, the resin tapes were irradiated with ultraviolet light to bond the resin tapes to the upper surface of the glass film having marginal portions. Here, each of the resin tapes was attached at a position where the h1 in FIG. 4B is 130 mm. Subsequently, the marginal portions were continuously removed by radiating a $CO_2$ laser having a wavelength of 10.6 μm from the upper surface of the glass film having marginal portions. The $CO_2$ laser is radiated to a position where the h3 in FIG. 4C is 5 mm. A glass film with resin tape obtained after the cutting and removal was wound around a winding core through a protective sheet to produce a resin tape-attached glass roll. As a result, a glass film with resin tape having a length of 1 km could be wound into a roll 10 times without breakage. That is, even when laser cutting of the marginal portions was continuously performed over 10 km, no breakage occurred.

Further, the above resin tape-attached glass roll having a length of 1 km was unrolled, and subjected to cutting using a $CO_2$ laser having a wavelength of 10.6 μm to continuously remove width-directional opposite edge regions of the glass film with resin tape on which the resin tapes were formed, thereby producing a glass film. The $CO_2$ laser is radiated to a position away inwardly from an edge of the glass film with resin tape by 35 mm (5 mm inward from an outer edge of the resin tapes). The produced glass film was further wound through a protective film to form a glass roll. The above ten resin tape-attached glass rolls were unrolled, and each of the resulting ten tape-attached glass films was used to produce a glass roll. As a result, all of the ten glass films could be wound without breakage.

Comparative Example

Except that no resin tape was used, a glass roll was produced in the same manner as that in Inventive Example. As a result, it was unable to produce a glass roll having a length of 1 km. Laser cutting of the marginal portions was tried over a cumulative distance of 10 km. However, breakage occurred 53 times.

LIST OF REFERENCE SIGNS

10: forming apparatus
21: resin tape
30: laser light source
40: winding core
51: protective sheet
Ga: glass film with resin tape
Gb: marginal portion
Gc: glass film having marginal portions
Gf: wrinkle
Gg: effective portion
Gh: non-effective portion
Gi: resin tape-attached glass roll
Gj: upper surface
Gk: glass film
Gl: width-directional opposite edge region on which resin tapes are formed
Gm: glass roll

What is claimed is:

1. A manufacturing method of glass film with resin tape comprising:
a forming step of continuously forming an elongated glass film having marginal portions in width-directional opposite edge regions thereof from molten glass, wherein an effective portion is formed in a width-directional central region of the glass film between the marginal portions;
an annealing step of annealing the glass film;
a resin tape forming step of continuously forming resin tapes on the glass film in a length direction of the glass film, each of the resin tapes being formed at a position adjacent to a respective one of the marginal portions and separated from the respective marginal portions by a given distance from the respective marginal portions with at least a portion of the effective portion between the resin tapes being free from being covered by the resin tapes, wherein the resin tape forming step comprises a resin tape attaching step of attaching the resin tapes to a surface of the glass film while continuously feeding the resin tapes from a corresponding resin tape roll, and the resin tape attaching step includes applying an adhesive to an interface between each of the resin tapes and the glass film;
a marginal portion removal step of continuously removing each of the marginal portions from the glass film by cutting the glass film at a position between each marginal portion and a corresponding one of the resin tapes to form the glass film with resin tape; and
applying a protective sheet to the glass film between the resin tapes, the protective sheet having a thickness greater than a total thickness of the resin tapes and the adhesive.

2. The manufacturing method of glass film with resin tape as recited in claim 1, wherein the resin tape forming step includes forming the resin tapes at positions away from edge sides of the glass film by 40% or less of a width of the glass film.

3. The manufacturing method of glass film with resin tape as recited in claim 1, wherein the forming step includes using one of a float process, an overflow downdraw process, and a slot downdraw process.

4. The manufacturing method of glass film with resin tape as recited in claim 1, wherein the effective portion has a thickness of 20 to 500 μm.

5. The manufacturing method of glass film with resin tape as recited in claim 1, which comprises a winding step of winding the glass film with resin tape in the form of a roll.

6. The manufacturing method of glass film with resin tape as recited in claim 5, wherein
the resin tape forming step includes continuously forming the resin tapes on only one surface of the glass film, and
the winding step includes winding the glass film with resin tape in the form of the roll, in a posture where the one surface of the glass film with resin tape faces outwardly.

7. The manufacturing method of glass film with resin tape as recited in claim 6, wherein the winding step includes continuously feeding the protective sheet from a protective sheet roll, and winding the glass film with resin tape in the form of the roll, together with the protective sheet.

8. A finished glass film manufacturing method comprising:
a step of obtaining the glass film with resin tape as recited in claim 1; and
a resin tape removal step of continuously cutting width-directional opposite sides of the effective portion of the glass film with resin tape that is free from being covered by the resin tapes to remove width-directional opposite edge regions of the glass film with resin tape on which the resin tapes are formed thereby forming the finished glass film.

9. The finished glass film manufacturing method as recited in claim 8, which comprises a winding step of winding the finished glass film in the form of a roll.

10. The finished glass film manufacturing method as recited in claim 9, which comprises a step of cutting the finished glass film in a width direction to form sheets of the finished glass film.

* * * * *